(12) United States Patent
Plaquin et al.

(10) Patent No.: US 11,615,188 B2
(45) Date of Patent: Mar. 28, 2023

(54) EXECUTING SOFTWARE

(71) Applicant: HEWLETT-PACKARD DEVELOPMENT COMPANY, L.P., Spring, TX (US)

(72) Inventors: David Plaquin, Bristol (GB); Ijlal Loutfi, Bristol (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/604,161

(22) PCT Filed: May 2, 2018

(86) PCT No.: PCT/US2018/030679
§ 371 (c)(1),
(2) Date: Oct. 9, 2019

(87) PCT Pub. No.: WO2019/212547
PCT Pub. Date: Nov. 7, 2019

(65) Prior Publication Data
US 2021/0326443 A1    Oct. 21, 2021

(51) Int. Cl.
*G06F 21/57*    (2013.01)
*H04L 9/08*    (2006.01)

(52) U.S. Cl.
CPC .......... *G06F 21/572* (2013.01); *H04L 9/0819* (2013.01); *H04L 9/0894* (2013.01); *G06F 2221/033* (2013.01)

(58) Field of Classification Search
CPC ............. G06F 21/572; G06F 2221/033; H04L 9/0819; H04L 9/0894
See application file for complete search history.

(56) References Cited

U.S. PATENT DOCUMENTS

| | | | |
|---|---|---|---|
| 7,530,103 B2 | 5/2009 | Willman et al. | |
| 7,984,286 B2 * | 7/2011 | Zimmer | G06F 21/575 713/176 |
| 8,201,240 B2 | 6/2012 | Tarkkala | |
| 8,214,632 B2 | 7/2012 | Choi et al. | |
| 8,566,574 B2 | 10/2013 | Shriver | |
| 9,177,153 B1 | 11/2015 | Perrig et al. | |
| 9,609,000 B2 | 3/2017 | Karame et al. | |
| 9,621,547 B2 | 4/2017 | Sharaga et al. | |
| 9,653,004 B2 * | 5/2017 | Boscher | H04L 9/0869 |

(Continued)

*Primary Examiner* — Aurel Prifti
(74) *Attorney, Agent, or Firm* — Knobbe, Martens, Olson & Bear, LLP

(57) ABSTRACT

An example method is disclosed, for example a method of executing a software module in a computing system, the method comprising executing, in a first processing device of the computing system, a first software module to verify a second software module and to cause a second processing device of the computing system to execute the second software module, executing, in the second processing device, the second software module to execute, in the second processing device, a third software module and to provide a first key of a key pair to the third software module, and protecting, by the second processing device, a memory space associated with the third software module, wherein the memory space contains the first key of the key pair, wherein the first processing device contains a second key of the key pair.

15 Claims, 3 Drawing Sheets

(56) References Cited

U.S. PATENT DOCUMENTS

| | | | |
|---|---|---|---|
| 9,830,456 B2 | 11/2017 | Grieco et al. | |
| 2005/0086511 A1* | 4/2005 | Balacheff | G06F 21/57 |
| | | | 726/34 |
| 2008/0168275 A1* | 7/2008 | De Atley | H04L 9/14 |
| | | | 709/219 |
| 2010/0023778 A1* | 1/2010 | Hauck | G06F 21/575 |
| | | | 713/182 |
| 2013/0013931 A1* | 1/2013 | O'Hare | H04L 9/085 |
| | | | 713/189 |
| 2013/0055335 A1 | 2/2013 | Chien | |
| 2014/0089651 A1* | 3/2014 | Yao | H04L 9/3247 |
| | | | 713/2 |
| 2015/0113258 A1* | 4/2015 | Grieco | G06F 21/572 |
| | | | 713/2 |
| 2015/0199520 A1* | 7/2015 | Woolley | G06F 9/44505 |
| | | | 713/2 |
| 2016/0125187 A1 | 5/2016 | Oxford | |
| 2016/0132681 A1 | 5/2016 | Karame et al. | |
| 2016/0182238 A1* | 6/2016 | Dewan | H04L 9/321 |
| | | | 713/193 |
| 2016/0205074 A1 | 7/2016 | Mitchell | |
| 2016/0274918 A1* | 9/2016 | Moon | G06F 21/575 |
| 2016/0364570 A1* | 12/2016 | Stern | G06F 21/575 |
| 2017/0300696 A1* | 10/2017 | Qin | G06F 21/64 |
| 2018/0032734 A1* | 2/2018 | Gunti | G06F 21/575 |
| 2018/0239901 A1* | 8/2018 | Jeansonne | G06F 21/52 |
| 2019/0005271 A1* | 1/2019 | Subramony | G06F 21/85 |
| 2019/0266331 A1* | 8/2019 | Sanchez Diaz | G06F 21/51 |
| 2021/0126801 A1* | 4/2021 | Nix | G06F 8/60 |

* cited by examiner

100

EXECUTING SOFTWARE

BACKGROUND

A computing system may include a trusted secure processor that controls a boot process. For example, the trusted secure processor may load a firmware, such as for example a BIOS firmware, and cause a second, untrusted processor in the computing system to execute the firmware. The firmware executing on the untrusted processor may load software components such as for example a boot loader and/or operating system.

BRIEF DESCRIPTION OF DRAWINGS

Examples will now be described, by way of non-limiting example, with reference to the accompanying drawings, in which.

DETAILED DESCRIPTION

Figure 1:
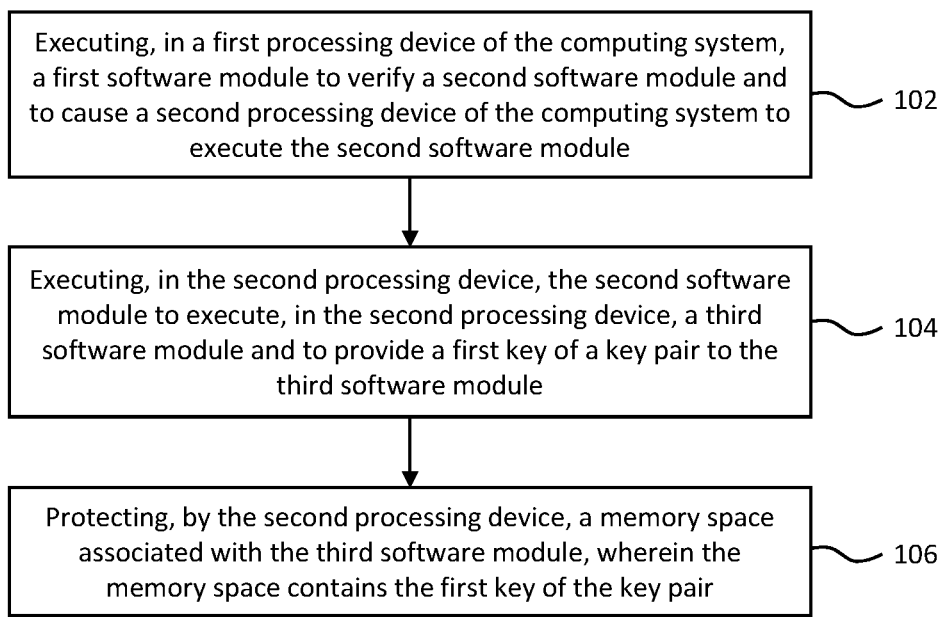
FIG. 1 is a flow chart of an example of a method of executing a software module in a computing system.

FIG. 1 is a flow chart of an example of a method 100 of executing a software module in a computing system. The method 100 comprises, in block 102, executing, in a first processing device of the computing system, a first software module to verify a second software module and to cause a second processing device of the computing system to execute the second software module. In some examples, the first processing device may be a trusted secure processor, and in some examples may be a processor that is first invoked upon power on or boot of the computing system and caused to execute the first software module. In some examples, the first software module may comprise software or firmware stored in storage accessible by the first processing device, for example storage within the first processing device. In some examples, the second software module may be a firmware such as for example a BIOS firmware or UEFI firmware.

The method 100 also comprises, in block 104, executing, in the second processing device, the second software module to execute, in the second processing device, a third software module and to provide a first key of a key pair to the third software module. Thus, for example, if the first processing device is a trusted secure processor, the second software module (e.g. firmware) may be checked, verified and/or authenticated by the first processing device executing the first software module (e.g. by verifying a hash value of the first software module against a hash value stored in the first processing device, and/or verifying a digital signature of the second software module), and hence the second software module executing on the second processing device may be considered as trusted, even though the second processing device itself in some examples may be considered as untrusted. Hence, the third software module, for example invoked by the second software module, can also in some examples be considered as trusted. In some examples, the third software module may also be checked, verified or authenticated.

In some examples, executing, in the second processing device, the second software module to provide a first key of a key pair to the third software module may comprise causing the third software module to generate the first and second keys of the key pair. The second key (e.g. public key) of the key pair may then be provided to the first processing device.

In block 106, the method comprises protecting, by the second processing device, a memory space associated with the third software module, wherein the memory space contains the first key of the key pair. This may, in some examples, ensure that the first key cannot be accessed by other executing software modules, even for example an operating system, thus protecting in some examples against a compromised operating system. In some examples, the protection may prevent other software modules from accessing the memory space, or may encrypt the memory space. In some examples, the memory space may also include the whole of the third software module's instruction and/or data space. In some examples, the memory space may be a space in memory of the computing system. In some examples, the second processing device may provide functionality, such as for example Software Guard Extensions (SGX), to protect the memory space.

The first processing device contains a second key of the key pair. Thus there may in some examples be a secure channel between the first processing device and the third software module executing on the second processing device. For example, the third software module may be able to send messages to the first processing device that are signed and/or encrypted such that they may be received by the first processing device, decrypted if encrypted, and verified by the first processing device that they originated from the third software module using the first key of the key pair. In some examples, the key pair may be a symmetric key pair or may in some examples be an asymmetric key pair.

In some examples, the first processing device may provide (and may in some examples also generate) a credential such as a key of a key pair and send the credential to the second processing device, e.g. to the third software module executing on the second processing device. The kay may be a symmetric key or a public key of a key pair. Therefore, the first processing device may also in some examples be able to send messages or information to the third software module in a secure manner, such as for example encrypted or verifiable by the public key.

Figure 2:
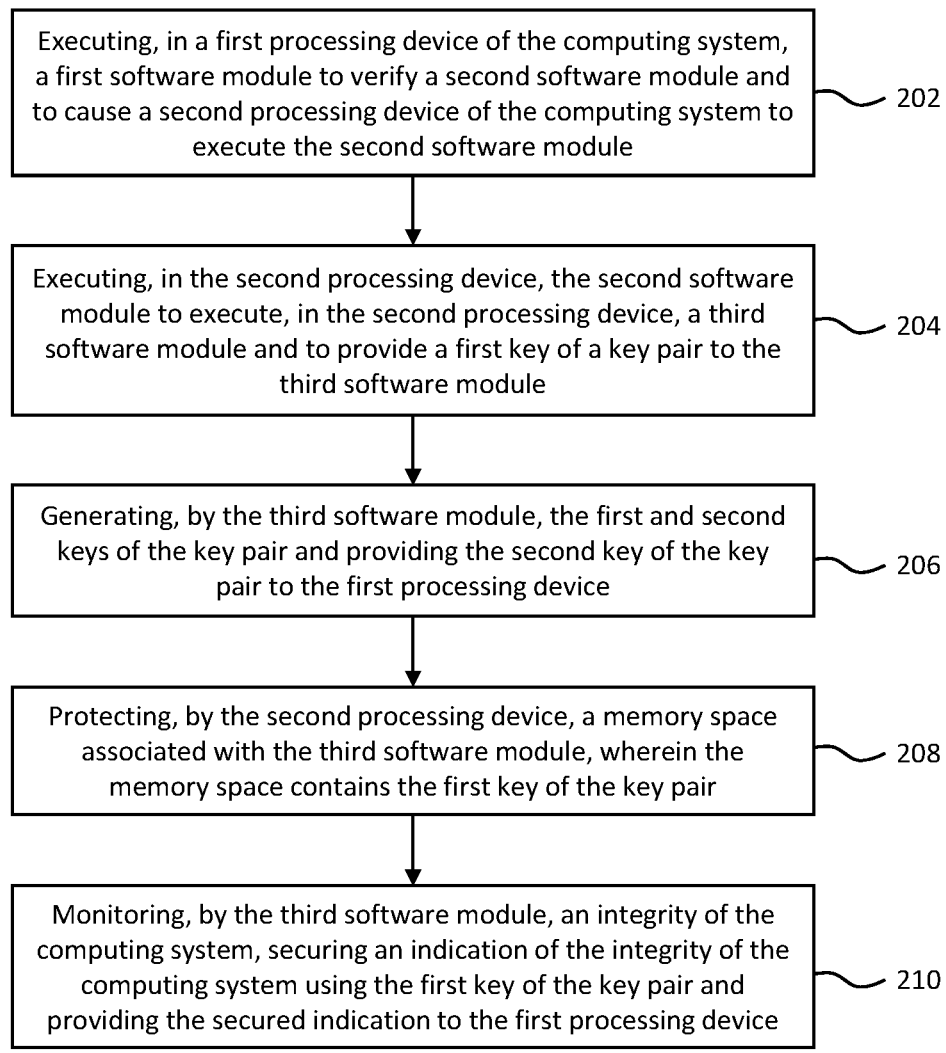
FIG. 2 is a flow chart of an example of a method of executing a software module in a computing system.

FIG. 2 shows an example of a method 200 of executing a software module in a computing system. The method comprises, in block 202, executing, in a first processing device of the computing system, a first software module to verify a second software module and to cause a second processing device of the computing system to execute the second software module. The method also comprises, in block 204, executing, in the second processing device, the second software module to execute, in the second processing device, a third software module and to provide a first key of a key pair to the third software module. The first processing device contains a second key of the key pair. For example, the second key of the key pair is stored in a memory of the first processing device, such as for example an internal memory of the first processing device. In some examples, the blocks 202 and 204 of the method 200 are similar or identical to the blocks 102 and 104 respectively of the method 100 described above with reference to FIG. 1.

The method 200 also comprises, in block 206, generating, by the third software module, the first and second keys of the key pair and providing the second key of the key pair to the first processing device. For example, the key pair may be generated directly by the third software module, or generating may comprise obtaining the key pair from another source, such as for example a cryptographic component (CC) of the computing system. In some examples, the second key is a public key of an asymmetric key pair.

In block 208, the method 200 comprises protecting, by the second processing device, a memory space associated with the third software module, wherein the memory space contains the first key of the key pair. In some examples, block 208 is similar or identical to block 106 of the method 100 of FIG. 1.

Block 210 of the method 200 comprises monitoring, by the third software module, an integrity of the computing system, securing an indication of the integrity of the computing system using the first key of the key pair and providing the secured indication to the first processing device. Therefore, in some examples, the third software module may be a monitoring or reporting module that communicates with the first processing device and allows the first processing device to monitor or determine an integrity of the computing system. For example, the integrity may be the status of one or more functions or other software modules, such as for example an antivirus function, a firewall function or any other function related to security of the computing system or other function.

Figure 3:
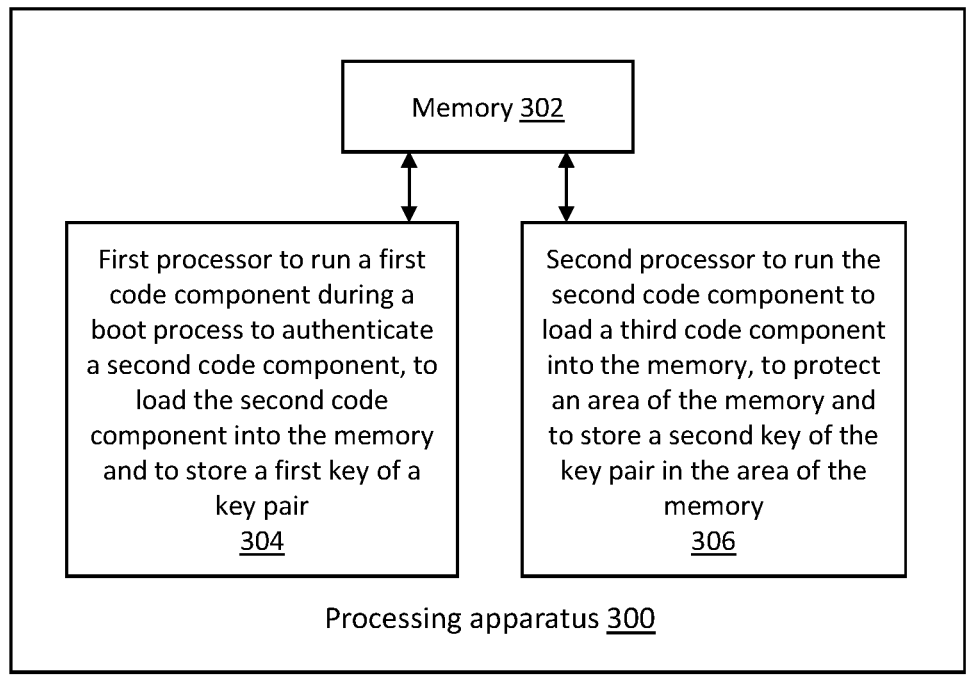
FIG. 3 is a simplified schematic of an example of a processing apparatus.

FIG. 3 is a simplified schematic of an example of a processing apparatus 300, such as for example a computing apparatus or device. The processing apparatus 300 comprises a memory 302 and a first processor 304 to run a first code component during a boot process to authenticate a second code component, to load the second code component into the memory and to store a first key of a key pair. In some examples, the first code component is a firmware internal to or accessible the first processor 304, which may in some examples be a trusted secure processor. The second code component may in some examples be a firmware such as a BIOS or UEFI firmware or a boot firmware.

The processing apparatus 300 also comprises a second processor 306, such as for example an untrusted processor, to run the second code component to load a third code component into the memory, to protect an area of the memory and to store a second key of the key pair in the area of the memory. In some examples, as the second code component is authenticated, it may be considered as trusted and hence the third code component may also be considered as trusted. In some examples, the third code component may also be authenticated, e.g. by the first processor 304 or by the second code component.

In some examples, as the first processor stores the first key of the key pair and the second key is accessible by the third code component (e.g. the area of the memory is an area allocated to or associated with the third code component), there may be a secure channel for communication between the third code component executing on the second processor 306 and the first processor 304. For example, the third code component may be able to send signed and/or encrypted information or messages to the first processor 304.

In some examples, the second processor 306 is to run the third code component to generate the first and second keys of the key pair and to provide the first key of the key pair to the first processor. In some alternative examples, at least the first key may be stored within the first processor, for example at manufacture or prior to a power on or boot procedure.

In some examples, the second processor is to run the third code component to determine a status of at least one operational characteristic of the processing apparatus and to provide a message secured by the second key to the first processor, wherein the message includes an indication of the status. Thus, in some examples, the third code component may be for example a monitoring component, and the at least one operational characteristic may comprise a security characteristic of the processing apparatus 300, such as for example a status of a firewall, antivirus program or other security related characteristic. Therefore, in some examples, the first processor 304 may determine one or more operational characteristics of the processing apparatus 300 through secure communication with the third code component executing on the second processor 306. That is, for example, the communication may be encrypted, and/or the communication may be signed such that the first processor 304 may verify that the third code component is the origin of the communications.

In some examples, the area of memory 302 that stores the second key (and that in some examples also stores the third code component) may be protected, such as for example by encryption and/or restricted access by other executing components. For example, the second processor 306 may in some examples protect the area of memory, for example using SGX.

Figure 4:
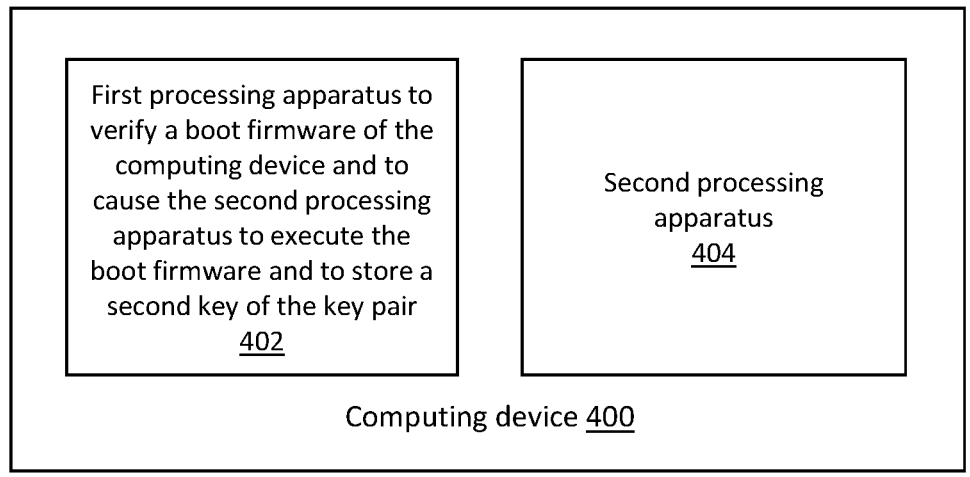
FIG. 4 is a simplified schematic of an example of a computing device.

FIG. 4 is a simplified schematic of an example of a computing device 400 comprising a first processing apparatus 402 (e.g. a trusted processor) to verify a boot firmware (e.g. BIOS or UEFI firmware) of the computing device, and a second processing apparatus 404, wherein the first processing apparatus 402 is to cause the second processing apparatus 404 to execute the boot firmware. In some examples, therefore, the boot firmware being executed by the second processing apparatus 404 can be considered to be trusted.

The boot firmware is to cause the second processing apparatus 404 to load a software module into a memory (not shown) of the computing device 400 and to secure an area of the memory associated with the software module that contains a first key of a key pair. For example, the area of the memory, which in some examples contains the code and/or data for the software module, may be secured using SGX or another feature of the second processing apparatus 404.

The first processing apparatus 402 is to store a second key of the key pair. Therefore, in some examples, there may be a secure communication channel between the software module executing on the second processing apparatus 404 and the first processing apparatus 402.

In some examples, the key pair comprises a symmetric key pair, or the key pair comprises an asymmetric key pair wherein the second key comprises a public key.

In some examples, the second processing apparatus is to run the software module to generate the first and second keys of the key pair and to send the second key of the key pair to the first processing apparatus. The second key may in some examples be a public key of an asymmetric key pair.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method of executing a software module in a computing system, the method comprising:
   executing, in a first processing device of the computing system, a first software module to verify a second software module and to cause a second processing device of the computing system to execute the second software module;
   executing, in the second processing device, the second software module to execute, in the second processing device, a third software module and to provide a first key of a key pair to the third software module; and
   protecting, by the second processing device, a memory space associated with the third software module, wherein the memory space contains the first key of the key pair;
   wherein the first processing device contains a second key of the key pair.

2. The method of claim 1, wherein the first processing device comprises a trusted processing device.

3. The method of claim 1, wherein the second software module comprises a boot firmware of the computing system.

4. The method of claim 1, comprising generating, by the third software module, the first and second keys of the key pair and providing the second key of the key pair to the first processing device.

5. The method of claim 1, wherein the key pair comprises one of a symmetric key pair and an asymmetric key pair.

6. The method of claim 1, comprising monitoring, by the third software module, an integrity of the computing system, securing an indication of the integrity of the computing system using the first key of the key pair and providing the secured indication to the first processing device.

7. The method of claim 1, wherein the second key of the key pair is stored in a memory of the first processing device.

8. A processing apparatus comprising:
   a memory;
   a first processor to run a first code component during a boot process to authenticate a second code component, to load the second code component into the memory and to store a first key of a key pair; and
   a second processor to run the second code component to load a third code component into the memory, to protect an area of the memory and to store a second key of the key pair in the area of the memory.

9. The processing apparatus of claim 8, wherein the first code component comprises a firmware of the first processor and the second code component comprises a boot firmware of the processing apparatus.

10. The processing apparatus of claim 8, wherein the second processor is to run the third code component to generate the first and second keys of the key pair and to provide the first key of the key pair to the first processor.

11. The processing apparatus of claim 8, wherein the second processor is to run the third code component to determine a status of at least one operational characteristic of the processing apparatus and to provide a message secured by the second key to the first processor, wherein the message includes an indication of the status.

12. A computing device comprising:
   a first processing apparatus to verify a boot firmware of the computing device; and
   a second processing apparatus, wherein the first processing apparatus is to cause the second processing apparatus to execute the boot firmware;
   wherein the boot firmware is to cause the second processing apparatus to load a software module into a memory of the computing device and to secure an area of the memory associated with the software module that contains a first key of a key pair; and
   wherein the first processing apparatus is to store a second key of the key pair.

13. The computing device of claim 12, wherein the first processing apparatus comprises a trusted processor.

14. The computing device of claim 12, wherein the key pair comprises a symmetric key pair, or the key pair comprises an asymmetric key pair wherein the second key comprises a public key.

15. The computing device of claim 12, wherein the second processing apparatus is to run the software module to generate the first and second keys of the key pair and to send the second key of the key pair to the first processing apparatus.

* * * * *